US 9,995,590 B1

United States Patent
Buvid et al.

(10) Patent No.: US 9,995,590 B1
(45) Date of Patent: Jun. 12, 2018

(54) PREVENTIVE MEASURES FOR A COGNITIVE IMPAIRED USER

(71) Applicant: INTERNATIONAL BUSINESS MACHINES CORPORATION, Armonk, NY (US)

(72) Inventors: Daniel J. Buvid, Rochester, MN (US); Eric J. Campbell, Rochester, MN (US); Tyler Jandt, Rochester, MN (US); Joseph Kuczynski, North Port, FL (US)

(73) Assignee: International Business Machines Corporation, Armonk, NY (US)

( * ) Notice: Subject to any disclaimer, the term of this patent is extended or adjusted under 35 U.S.C. 154(b) by 0 days. days.

(21) Appl. No.: 15/711,097

(22) Filed: Sep. 21, 2017

Related U.S. Application Data (63) Continuation of application No. 15/462,969, filed on Mar. 20, 2017.

(51) Int. Cl.
| | |
|---|---|
| *B60W 30/18* | (2012.01) |
| *G01C 21/34* | (2006.01) |
| *H04W 4/02* | (2018.01) |
| *G08G 1/127* | (2006.01) |
| *G08G 1/056* | (2006.01) |
| *F16H 59/74* | (2006.01) |
| *F16H 63/48* | (2006.01) |

(52) U.S. Cl.
CPC ......... *G01C 21/3461* (2013.01); *F16H 59/74* (2013.01); *F16H 63/48* (2013.01); *G08G 1/056* (2013.01); *G08G 1/127* (2013.01); *H04W 4/021* (2013.01); *F16H 2059/746* (2013.01)

(58) Field of Classification Search
CPC ............... F16H 59/74; F16H 2059/746; G01C 21/3461; B60W 10/02; B60W 10/04; B60W 30/18; B60W 2540/22; B60W 2540/26; B60W 2710/021; B60W 40/08; B60W 2040/0818; B60W 2040/0872
See application file for complete search history.

(56) References Cited

U.S. PATENT DOCUMENTS

| | | | |
|---|---|---|---|
| 5,825,283 A | 10/1998 | Camhi | |
| 7,650,233 B2 | 1/2010 | Motoyama et al. | |
| 8,688,306 B1 | 4/2014 | Nemec et al. | |
| 8,823,502 B2 | 9/2014 | Berkobin et al. | |
| 8,830,054 B2 | 9/2014 | Weiss | |
| 2007/0126604 A1* | 6/2007 | Thacher | G01C 21/26 340/995.13 |
| 2008/0162034 A1* | 7/2008 | Breen | G01C 21/26 701/533 |
| 2011/0304465 A1 | 12/2011 | Boult et al. | |

(Continued)

OTHER PUBLICATIONS

IBM: List of IBM Patents or Patent Applications Treated as Related (Appendix P), Oct. 12, 2017, pp. 1-2.

(Continued)

*Primary Examiner* — Edwin A Young
(74) *Attorney, Agent, or Firm* — Michael O'Keefe (57) ABSTRACT

A computing device detects that an ignition switch of the vehicle was activated, wherein the vehicle includes a navigation device. The computing device requests a destination from the navigation device. The computing device interlocking, an operation of the vehicle based on determining that the destination is not valid.

1 Claim, 5 Drawing Sheets

(56) References Cited

U.S. PATENT DOCUMENTS

| | | | |
|---|---|---|---|
| 2013/0158870 A1* | 6/2013 | Van Wiemeersch | G08G 1/0962 |
| | | | 701/527 |
| 2014/0309863 A1* | 10/2014 | Ricci | G01C 21/3484 |
| | | | 701/36 |
| 2016/0075282 A1 | 3/2016 | Johnson | |
| 2016/0362112 A1 | 12/2016 | Brewer et al. | |

OTHER PUBLICATIONS

Family Caregiver Alliance, "Dementia and Driving," https://www.caregiver.org/dementia-driving, Printed on Oct. 19, 2016, pp. 1-1.
Alzheimer's & Dementia Weekly, "Support and Insight for the Autumn of Life," Home Page, Latest Articles, http://www.alzheimersweekly.com/2014/12/5-warning-signs-for-drivers-with.html, Copyright 2007-2015, Alzheimer's Weekly LLC, pp. 1-2.
De Leon, "Silver Alerts Can Be a Thing of the Past", Assisted Living Directory, http://www.assisted-living-directory.com/content/silver-alert.cfm, Copyright 2014, Assisted-Living-Directory.com, pp. 1-3.
Franchise Works, e-Med-ID, "The World's First Emergency Medical Information Franchise Launches GPS Tracking Device," http://franchiseworks.com/franchise_news_story.aspx?nid=466#, Copyright 1999-2016 Franchise Works, pp. 1-2.
Buvid et al., U.S. Appl. No. 15/462,969, filed Mar. 20, 2017, titled "Preventive Measures for a Cognitive Impaired User", pp. 1-30.

\* cited by examiner

PREVENTIVE MEASURES FOR A COGNITIVE IMPAIRED USER

BACKGROUND

The present invention relates generally to providing preventive measures for users with cognitive impairment, and more particularly to a method of monitoring a location of a Cognitive Impaired User (CIU) and preventing the CIU to drive a vehicle without entering a destination.

Cognitively impaired users typically exhibit symptoms, such as a decline in memory, orientation, or other cognitive skills, which reduce the user's ability to perform everyday tasks. For example, CIU can suffer from Alzheimer's disease or dementia and can experience symptoms such as navigating off route while using a vehicle.

SUMMARY

Embodiments of the present invention provide a system, method, and program product for preventive measures for a cognitive impaired user. A computing device detects that an ignition switch of the vehicle was activated, wherein the vehicle includes a navigation device. The computing device requests a destination from the navigation device. The computing device interlocking, an operation of the vehicle based on determining that the destination is not valid.

DETAILED DESCRIPTION

Aspects of the present invention, as appreciated by the one skilled in the art, can be embodied as a system, method, or computer product. Accordingly, aspects of the present invention can take the form of an embodiment combining software (including firmware, resident software, microcode, etc.) and hardware aspects all generally referred to as a "module", "method" or "system." Furthermore, aspects of the present invention can take the form of a computer program product embodied in one or more computer-readable medium(s) having computer-readable program code/instructions embodied thereon including controllers, microcontrollers and mobile device processing units.

Driving a vehicle requires a set of skills from a user. These set of skills include not only the ability to control the vehicle but also cognitive skills that are required to navigate the vehicle. For example, a sense of direction and knowledge of a geographic location of an intended destination can be cognitive skills required to navigate the vehicle. A Cognitively Impaired User (CIU) can suffer from a reduction of the ability to navigate a vehicle. For example, the CIU can experience a loss of orientation, a loss of direction or forget the geographic location of an intended destination. Loss of orientation, for example, can result in the CIU driving a vehicle in an unknown direction, making it harder to locate the CIU was lost due to cognitive impairment.

Embodiments of the present invention provide methods, systems, and computer program products for preventing the CIU from operating a vehicle without entering a destination. Furthermore, embodiments of the present invention monitor that the CIU is following a route towards the destination and send an alert messages if the CIU is not following the route.

Various aspects of the present invention are described below with reference to flowchart illustrations and/or block diagrams of methods, system and computer program products. Embodiments of the present invention will now be described in detail with reference to the accompanying Figures.

Figure 1:
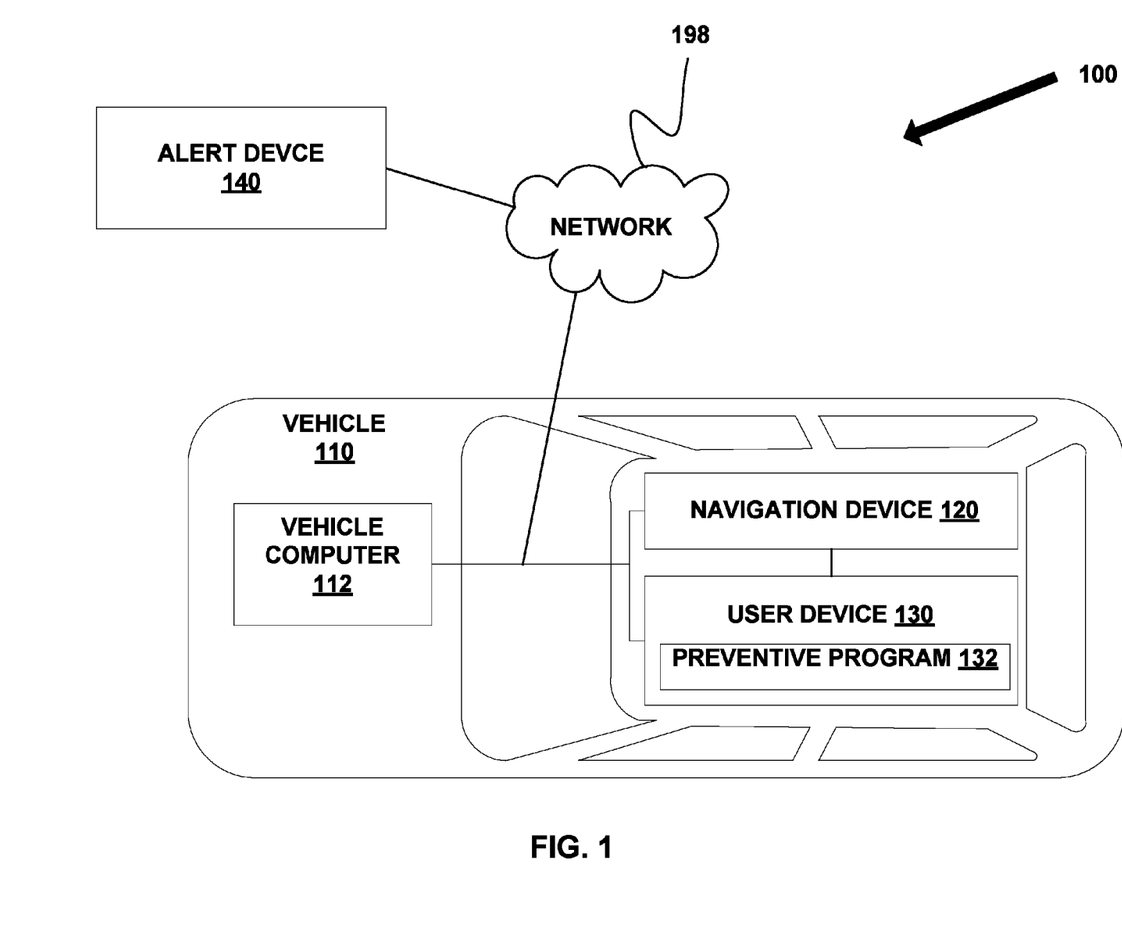
FIG. 1 illustrates a preventive measures for a CIU system in accordance with an embodiment of the invention.

FIG. 1 illustrates a CIU system 100, in accordance with an embodiment of the invention. In an example embodiment, the preventive measures for CIU system 100 includes at least an alert device 140 and vehicle 110 that can be controlled by vehicle computer 112, navigation device 120 and user device 130 (running preventive program 132), all interconnected via network 198.

In accordance with an embodiment of the invention, network 198 can be a cellular network, an intranet, a local area network (LAN), or a wide area network (WAN). Network 198 can include, for example, wired, wireless (such as GSM, Wi-Fi, Bluetooth, or a combination thereof). In other embodiments, network 198 can be implemented as the Internet, representing a worldwide collection of networks and gateways to support communications between devices connected to the Internet or other type of network either wired or wireless which allows the communications between devices of the preventive measures for a CIU system 100. In general, network 198 can be any combination of connections and protocols that will support communications between alert device 140, vehicle computer 112, navigation device 120, and user device 130.

Vehicle 110 can be a mobile machine that transports people. Typically, vehicle 110 is propelled by a powertrain. A powertrain includes components that control, generate power, and deliver the power for propelling vehicle 110. For example, the powertrain of a car includes an engine such as an electrical or internal combustion engine that is connected to a transmission, a driveshaft, and wheels, and wherein all of the powertrain components can be controlled by vehicle computer 112, as described below. In another embodiments, vehicle 110 can be a motorcycle, a car, a truck, a bus, a train, a boat, or an aircraft. According to an example embodiment, the powertrain can be controlled by vehicle computer 112 that reads data from various sensors and controls vehicle 110 by sending instructions to a series of actuators that controls the powertrain.

Vehicle computer 112 is a computing device that controls vehicle 110. According to an example embodiment, vehicle computer 112 can be an engine control unit (ECU) that is configured to receive data from various sensors located in vehicle 110 and controls various components of vehicle 110 through a series of actuators. For example, a gas valve can be an actuator that controls the powertrain to ensure the engine is providing sufficient power to propel vehicle 110. Control of the powertrain of vehicle computer 112 can include, for example, functionality such as turning off the engine, locking a gearbox handle in the parking position, disengaging a clutch and applying the brakes of the wheels of vehicle 110. According to an example embodiment, vehicle computer 112 is configured to exchange data with user device 130 such as sending an instructions to turn off the engine, lock the gearbox handle in the parking position, disengage the clutch, and apply the brakes. In another embodiment, vehicle computer 112 can be configured to receive instructions and exchange data with user device 130 and alert device 140 via network 198.

Navigation device 120 is a device that is configured to receive data from satellites or cellular antennas and calculate a geographical location of the current position of vehicle 110. According to an example embodiment, navigation device 120 can be a Global Positioning System (GPS) that is based on a global navigation satellite system and is configured to receive a destination as an input from a CIU. The destination can be entered in various formats such as an address, a set of coordinates, or a name of the location.

According to an example embodiment, navigation device 120 is configured to generate a route from the current position to a destination. Typically, a route is a mathematical representation of a path between geographical coordinates that can be performed by a set of step by step instructions that assist the CIU in navigating from the current position to the destination. The route can be generated by connecting waypoints located between the current location and the destination. A waypoint can be an intermediate point or place on a route, such as an intersection, at which the user has to change the course of vehicle 110. According to an example embodiment, the route is generated using a mathematical algorithms such as Dijkstra's algorithm (algorithm for finding the shortest paths between waypoints in a graph) or other shortest paths algorithms. In another embodiment, in the case that the destination cannot be converted to a route or the destination does not exist, navigation device 120 can re-request the destination from the user. In another embodiment, navigation device 120 can suggest an alternative destination based on comparing the destination entered by a CIU to the route history or by searching for similar destination the CIU entered to navigation device 120. According to an example embodiment, navigation device 120 can be configured to exchange data with user device 130 via network 198. In another embodiment, navigation device 120 can be integrated into user device 130.

In another embodiment, user device 130 or navigation device 120 can include a geo-fence feature to limit navigation area of a CIU. Geo-fence area is a virtual perimeter for a real world geographic area that triggers a software response when user device 130 or navigation device 120 leaves the geographic area. A geo-fence can be dynamically generated such as, for example, as a radius around a specific location on a route, or can be a predefined set of boundaries. For example, a maximum distance may be used for dynamic geo-fencing of a route, wherein deviation from the route for more than the maximum distance may represent that the vehicle is not following the route or is outside an approved area. According to an embodiment, in the case that the destination or a generated route falls outside an approved area such as the geo-fence boundaries, navigation device 120 can request an additional destination that falls within the geo-fence area.

Alert device 140 is a communication device that is capable of receiving data from user device 130 via network 198. For example, alert device 140 can be a mobile computer, a notebook, a laptop computer, a tablet computer, a handheld device, a smartphone, a wearable device, a thin client, or any other electronic device or computing system capable of receiving and sending calls, receiving and displaying messages, receiving and playing voice or video communications, and capable of sending and receiving data from user device 130, via network 198. One of the embodiments of alert device 140 can be a cellphone that is capable of receiving messages and displaying them to the user. For example, an "Amber alert" feature of a cellphone can be utilized that displays urgent messages on mobile devices accompanied by an alarming sound. In another embodiment, alert device 140 can be a computing device that can receive a location from user device 130 and display the location on the map.

User device 130 is a computing device that is configured to exchange data with navigation device 120, vehicle computer 112, and alert device 140 via network 198. According to an example embodiment, user device 130 can be a mobile computer, a notebook, a laptop computer, a tablet computer, a handheld device, a smartphone, a wearable device, a thin client, or any other electronic device or computing system that is configured to execute preventive program 132, receive vehicle 110 location and route information from navigation device 120 and control vehicle 110 by sending instructions to vehicle computer 112, via network 198. For example, user device 130 can be a cellphone that connects to a vehicle computer 112 and navigation device 120 and by sending instructions can request from a user to enter a destination to navigation device 120 and send instructions to vehicle computer 112 to prevent a CIU from driving vehicle 110 such as by preventing release of a gearbox handle from the parking position, disengaging a clutch, or applying the brakes of the wheels.

According to an example embodiment, preventive program 132 is a software program that can be executed on user device 130. Preventive program 132 can be configured to request a destination from CIU and prevent the operation of the vehicle 110 by sending an instruction to vehicle computer 110 whenever no destination is entered. Operations of preventive program 132 are described in further detail below with regard to FIG. 2.

Figure 2:
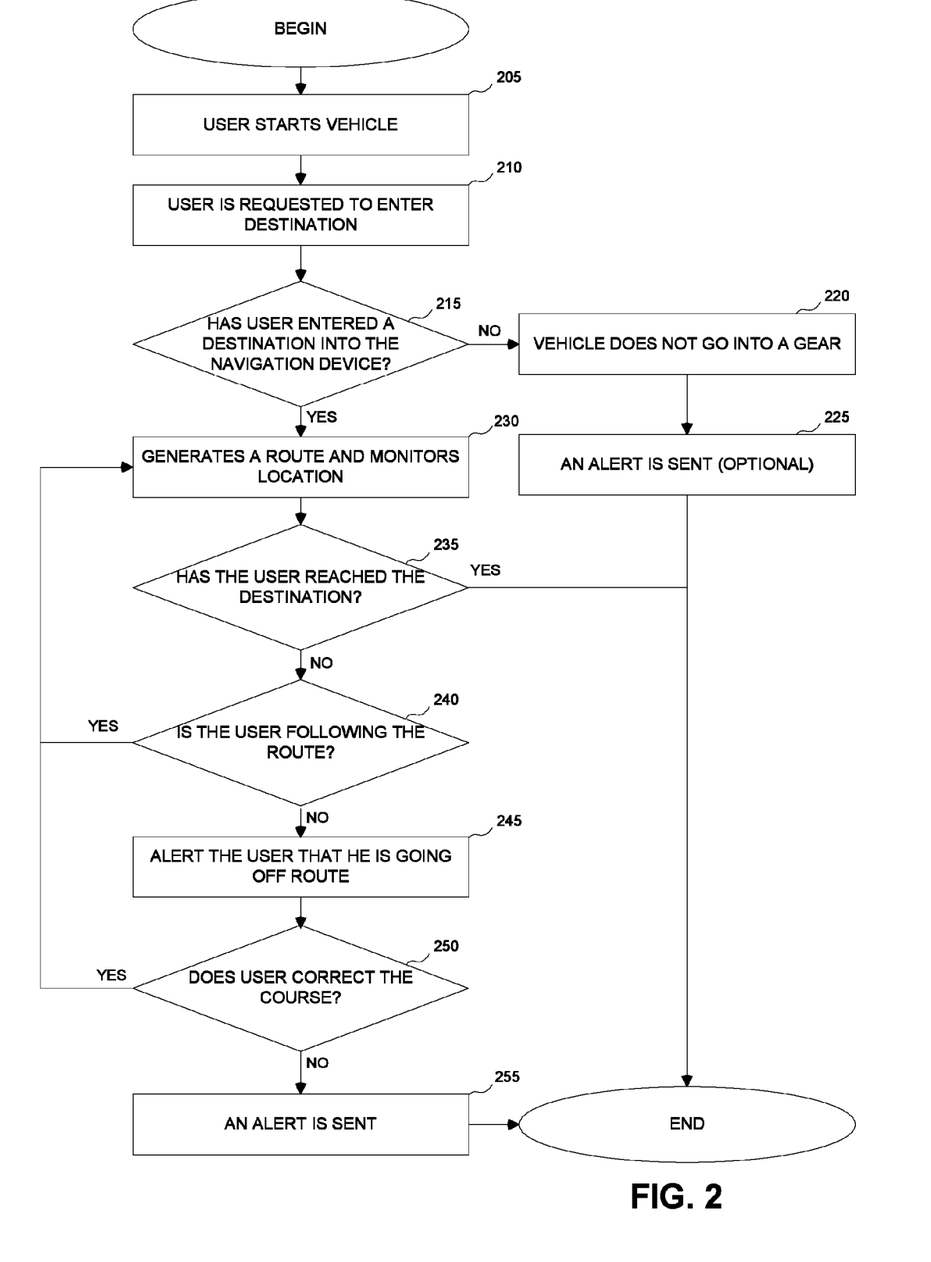
FIG. 2 is a flowchart, illustrating the operations of preventive program of FIG. 1, in accordance with an embodiment of the invention.

FIG. 2 is a flowchart illustrating the operations of preventive program 132. Referring to step 205, preventive program 132 receives information from vehicle computer 112 that the user started vehicle 110. For example, preventive program 132 can read a data from an appropriate register of vehicle computer 112 that represents an engine idle speed that indicates that a user started vehicle 110. In another embodiment, preventive program 132 can receive an ignition indication from vehicle computer 112 when a CIU activates an ignition switch. An ignition switch can be a mechanical or an electronic device that turns on the engine of vehicle 110 such as an ignition key or an engine start button.

Referring to step 210, preventive program 132 can request a destination. According to an example embodiment, preventive program 132 can request to enter a destination using voice, text or video via user device 130 or by sending an instruction to navigation device 120.

Referring to decision 215, preventive program 132 determines whether the destination was received by navigation device 120. According to an example embodiment, if a route can be generated from a current location to the destination (decision 215, "Yes" branch), preventive program 132 proceeds to step 230. For example, preventive program 132 can generate a route when the destination is within the geo-fenced boundaries. If the route cannot be generated (decision 215, "No" branch), preventive program 132 proceeds to step 220.

Referring to step 220, preventive program 132 can prevent vehicle 110 to go into a gear. According to an example embodiment, preventive program 132 can send an instruction to a vehicle computer 112 to interlock a gearbox handle in park position and not allow the gearbox to shift into a gear. In another embodiment, preventive program 132 can send an instruction to disengage the clutch or use other methods to prevent the movement of vehicle 110 such as, for example, applying the brakes, or turning off the engine. In further embodiments, preventive program 132 sends an instruction to vehicle computer 112 that blocks vehicle 110 from propelling such as applying the brakes, closing gas supply valve, or turning off the engine.

Referring to optional step 225, preventive program 132 sends an alert to alert device 140. According to an example embodiment, when vehicle 110 is operated without entering a destination, preventive program 132 can send an alert message via network 198 to alert device 140. For example, whenever vehicle 110 is operated without entering the destination to navigation device 120 preventive program 132 can send an alert message to alert device 140 that vehicle 110 is operated without destination and a current location of vehicle 110.

Referring to step 230, preventive program 132 generates a route and monitors vehicle 110 location. According to an example embodiment, preventive program 132 receives a route that was determined by navigation device 120 and tracks vehicle 110 location in relation to the route.

Referring to decision 235, preventive program 132 determines whether vehicle 110 reached the pre-determined destination. According to an example embodiment, preventive program 132 can use current location of vehicle 110 and destination to determine whether the distance between the destination and current location is within a predetermined threshold. Predetermined threshold creates a circular area around the destination, wherein the predetermined threshold value is the radius of the circular area. Whenever the current position of vehicle 110 is within the circular area, (decision 240, "Yes" branch), preventive program 132 finishes the execution. If the current position of vehicle 110 is not within the circular area (decision 235, "No" branch), preventive program 132 proceeds to decision 240.

Referring to decision 240, preventive program 132 can determine whether vehicle 110 follows the route. According to an example embodiment, preventive program 132 can calculate the shortest distance from the current position of vehicle 110 to the route. If the shortest distance is within a distance threshold value (a maximum distance between vehicle 110 and the route permitted by preventive program 132) then vehicle 110 is following the route (decision 240, "Yes" branch), and preventive program 132 proceeds to step 230. If the shortest distance is not within a distance threshold value (decision 240, "No" branch), preventive program 132 proceeds to step 245.

Referring to step 245, preventive program 132 can send an alert message to navigation device 120 stating that vehicle 110 is going off route. According to an example embodiment, preventive program 132 determines that vehicle 110 going off route. For example, program 132 can determine that vehicle 110 is going off route if vehicle 110 crosses the maximum distance from the route. According to an example embodiment, after determining that vehicle 110 goes off route, preventive program 132 sends an alert message to navigation device 120 requesting to return to the route.

Referring to decision 250, preventive program 132 determines whether vehicle 110 corrects the course and returns to the route. According to an example embodiment, preventive program 132 can determine whether the distance between the current position and one of a waypoints on the route is decreasing within a predetermined timeframe set by a user.

In another embodiment, preventive program 132 can determine the direction of vehicle 110 to determine that vehicle 110 returns to the route. For example, if vehicle 110 changes direction after going of route towards the route within a predetermined timeframe, then vehicle 110 returns to the route. If vehicle 110 returns to the route (decision 250, "Yes" branch), preventive program 132 proceeds to step 230. If vehicle 110 does not return to the route (decision 250, "No" branch), preventive program 132 proceeds to step 255.

Referring to step 255, preventive program 132 sends an alert to alert device 140. According to an example embodiment, if vehicle 110 continues to move off route, preventive program 132 sends an alert message to alert device 140 that can include a message that the user is going off route and vehicle 110 current location. In another embodiment, preventive program 132 can gradually reduce the speed of vehicle 110 to a complete stop by sending instructions to vehicle computer 112.

Figure 3:
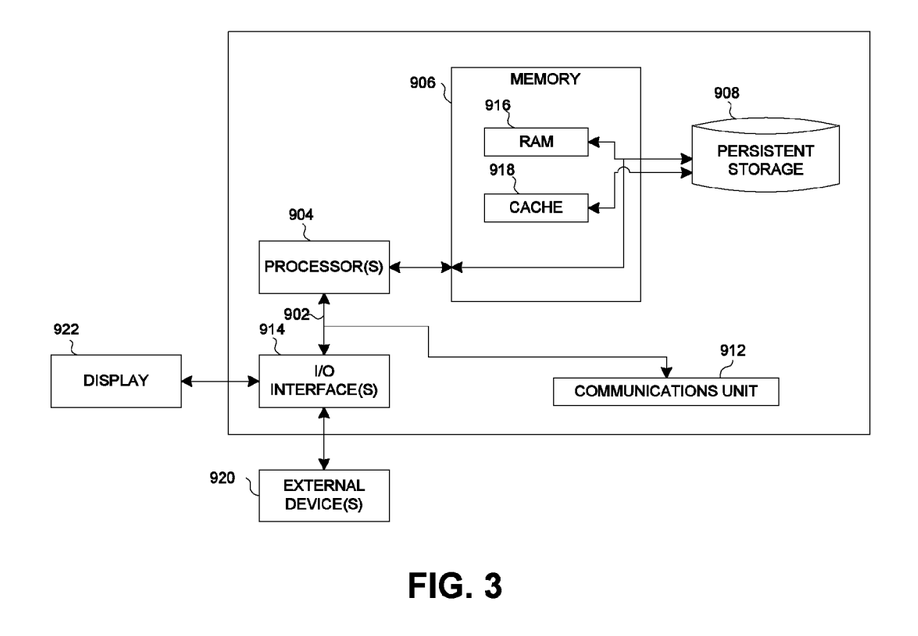
FIG. 3 is a block diagram depicting the hardware components of preventive measures for CIU system of FIG. 1, in accordance with an embodiment of the invention.

FIG. 3 depicts a block diagram of components of FIG. 1, such as alert device 140, vehicle computer 112, navigation device 120, and user device 130 in accordance with an illustrative embodiment of the present invention. It should be appreciated that FIG. 3 provides only an illustration of one implementation and does not imply any limitations with regard to the environments in which different embodiments can be implemented. Many modifications to the depicted environment can be made.

Alert device 140, vehicle computer 112, navigation device 120, and user device 130 include communications fabric 902, which provides communications between computer processor(s) 904, memory 906, persistent storage 908, communications unit 912, and input/output (I/O) interface(s) 914. Communications fabric 902 can be implemented with any architecture designed for passing data and/or control information between processors (such as microprocessors, communications and network processors, etc.), system memory, peripheral devices, and any other hardware components within a system. For example, communications fabric 902 can be implemented with one or more buses.

Memory 906 and persistent storage 908 are computer-readable storage media. In this embodiment, memory 906 includes random access memory (RAM) 916 and cache memory 918. In general, memory 906 can include any suitable volatile or non-volatile computer-readable storage media.

Preventive program 132 is stored in persistent storage 908 for execution by one or more of the respective computer processors 904 via one or more memories of memory 906. In this embodiment, persistent storage 908 includes a magnetic hard disk drive. Alternatively, or in addition to a magnetic hard disk drive, persistent storage 908 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 908 can also be removable. For example, a removable hard drive can be used for persistent storage 908. Other examples include optical and magnetic disks, thumb drives, and smart cards that are inserted into a drive for transfer onto another computer-readable storage medium that is also part of persistent storage 908.

Communications unit 912, in these examples, provides for communications with other data processing systems or devices. In these examples, communications unit 912 includes one or more network adapters or interface cards.

Communications unit 912 can provide communications through the use of either or both physical and wireless communications links. Preventive program 132 can be downloaded to persistent storage 908 through communications unit 912.

I/O interface(s) 914 allows for input and output of data with other devices that can be connected to alert device 140, vehicle computer 112, navigation device 120, and user device 130. For example, I/O interface 914 can provide a connection to external devices 920 such as a keyboard, keypad, a touch screen, and/or some other suitable input device. External devices 920 can also include portable computer-readable storage media such as, for example, thumb drives, portable optical or magnetic disks, and memory cards. Software and data used to practice embodiments of the present invention, e.g., preventive program 132, can be stored on such portable computer-readable storage media and can be loaded into persistent storage 908 via I/O interface(s) 914. I/O interface(s) 914 can also connect to a display 922.

Display 922 provides a mechanism to display data to a user and can be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention can be a system, a method, and/or a computer program product at any possible technical detail level of integration. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model can include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but can be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It can be managed by the organization or a third party and can exist on-premises or off-premises.

Community cloud: the cloud infrastructure is shared by several organizations and supports a specific community that has shared concerns (e.g., mission, security requirements, policy, and compliance considerations). It can be managed by the organizations or a third party and can exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
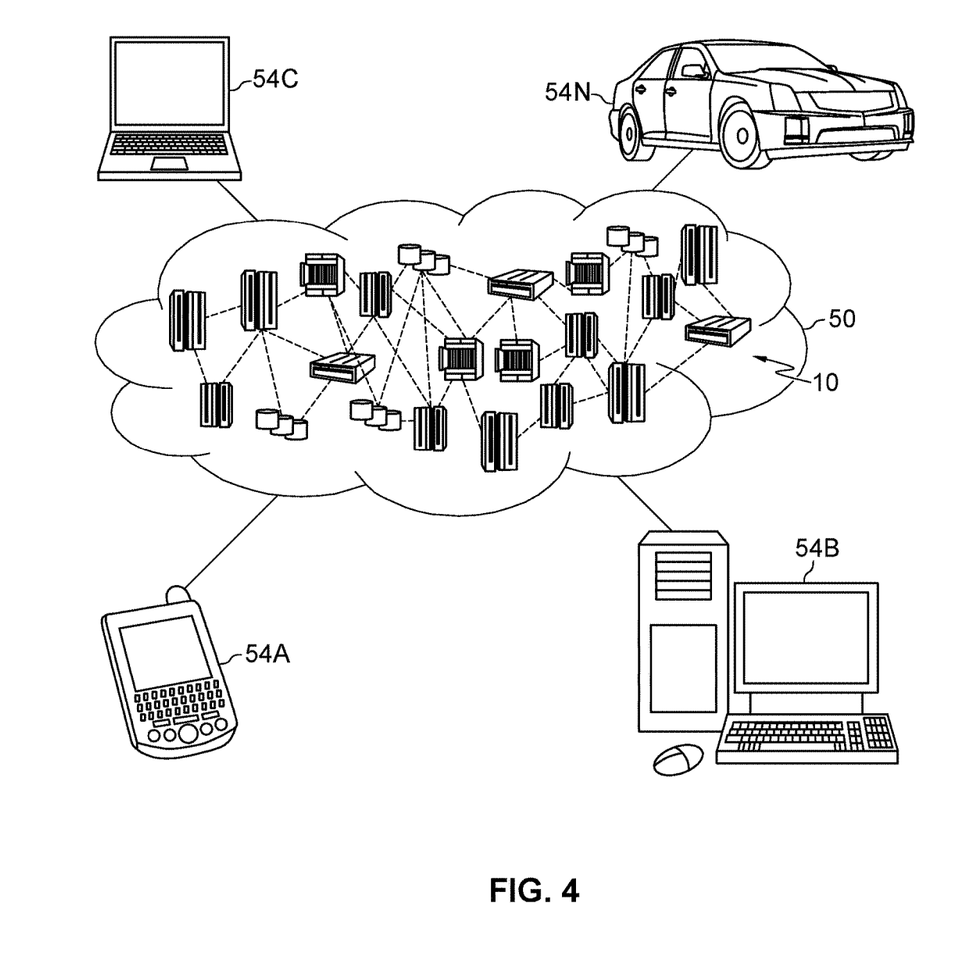
FIG. 4 depicts a cloud computing environment, in accordance with an embodiment of the invention.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N can communicate. Nodes 10 can communicate with one another. They can be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
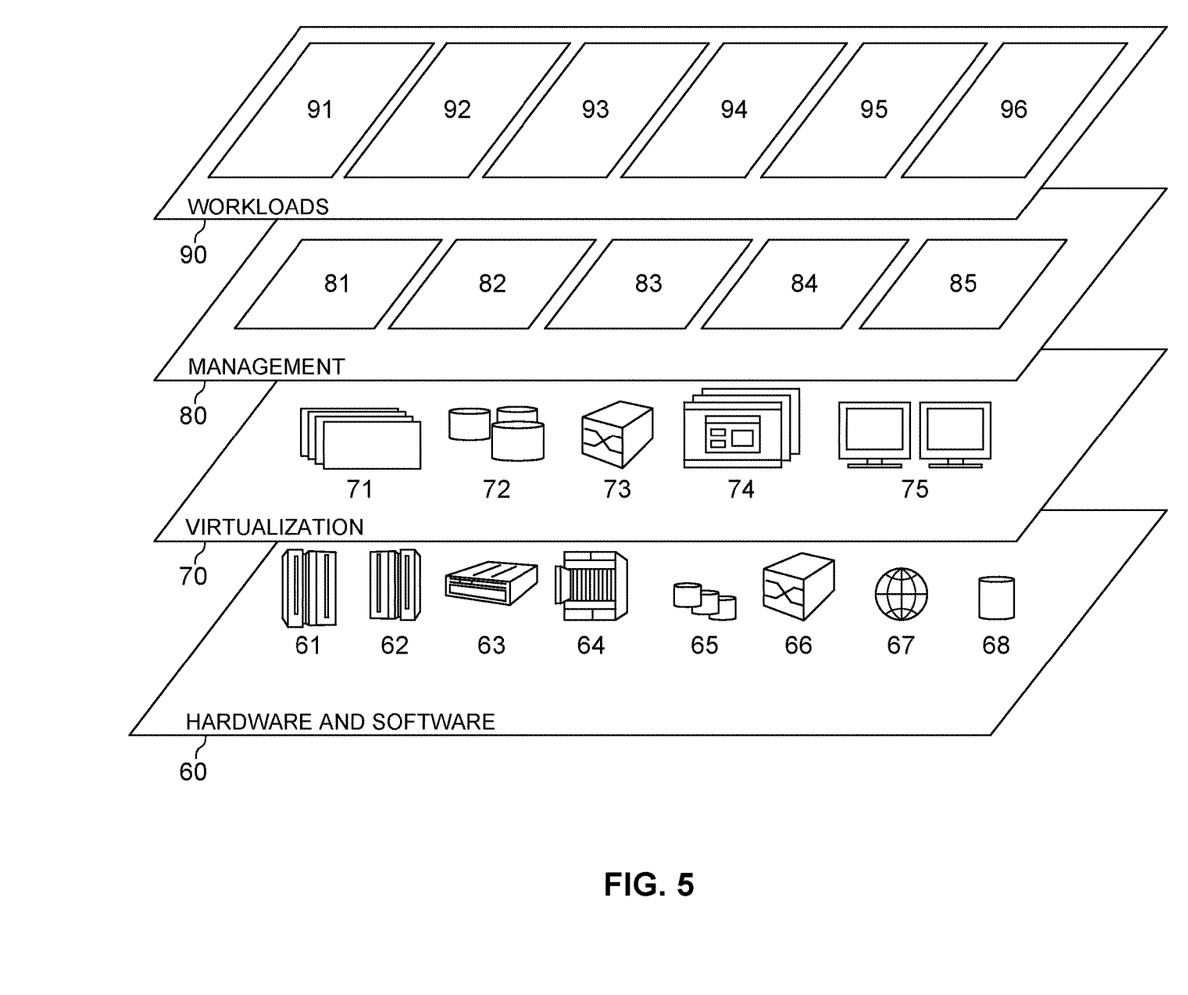
FIG. 5 depicts abstraction model layers, in accordance with an embodiment of the invention.

Referring now to FIG. 5, a set of functional abstraction layers provided by cloud computing environment 50 is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities can be provided: virtual servers 71; virtual storage 72; virtual networks 73, including virtual private networks; virtual applications and operating systems 74; and virtual clients 75.

In one example, management layer 80 can provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources can include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment can be utilized. Examples of workloads and functions which can be provided from this layer include: mapping and navigation 91; software development and lifecycle management 92; virtual classroom education delivery 93; data analytics processing 94; transaction processing 95; and preventive measures for CIU processing 96. Preventive measures for CIU processing 96 can relate to functionality that detects that a user started a vehicle, requests a destination and if the user fails to enter a valid destination blocks the vehicle from moving. In addition, CIU processing 96 can monitor the vehicle location and if the vehicle is driven off route notifies CIU processing 96 sends an alert.

What is claimed is:

1. A method for controlling a vehicle, the method comprising:
   detecting, by a computing device, that an ignition switch of the vehicle was activated, wherein the vehicle comprises a navigation device;
   requesting, by the computing device, a destination from the navigation device;
   based on determining that the destination is not valid, sending, by the computing device, an instruction to disengage a clutch of the vehicle;
   based on determining that the destination is valid, determining, by the computing device a route based on a current location and the destination, wherein the current location is determined by a Global Positioning System;
   monitoring, by the computing device, the current location of the vehicle; and
   based on determining, by the computing device, that the current location of the vehicle is outside of an approved area and that a vehicle direction is not towards the route, wherein the vehicle is outside of the approved area when the current location of the vehicle is outside of a geo-fence area, and wherein a current distance of the current location of the vehicle from the route is more than a maximum distance, sending, by the computing device, an alert message to an alert device.

* * * * *